UNITED STATES PATENT OFFICE.

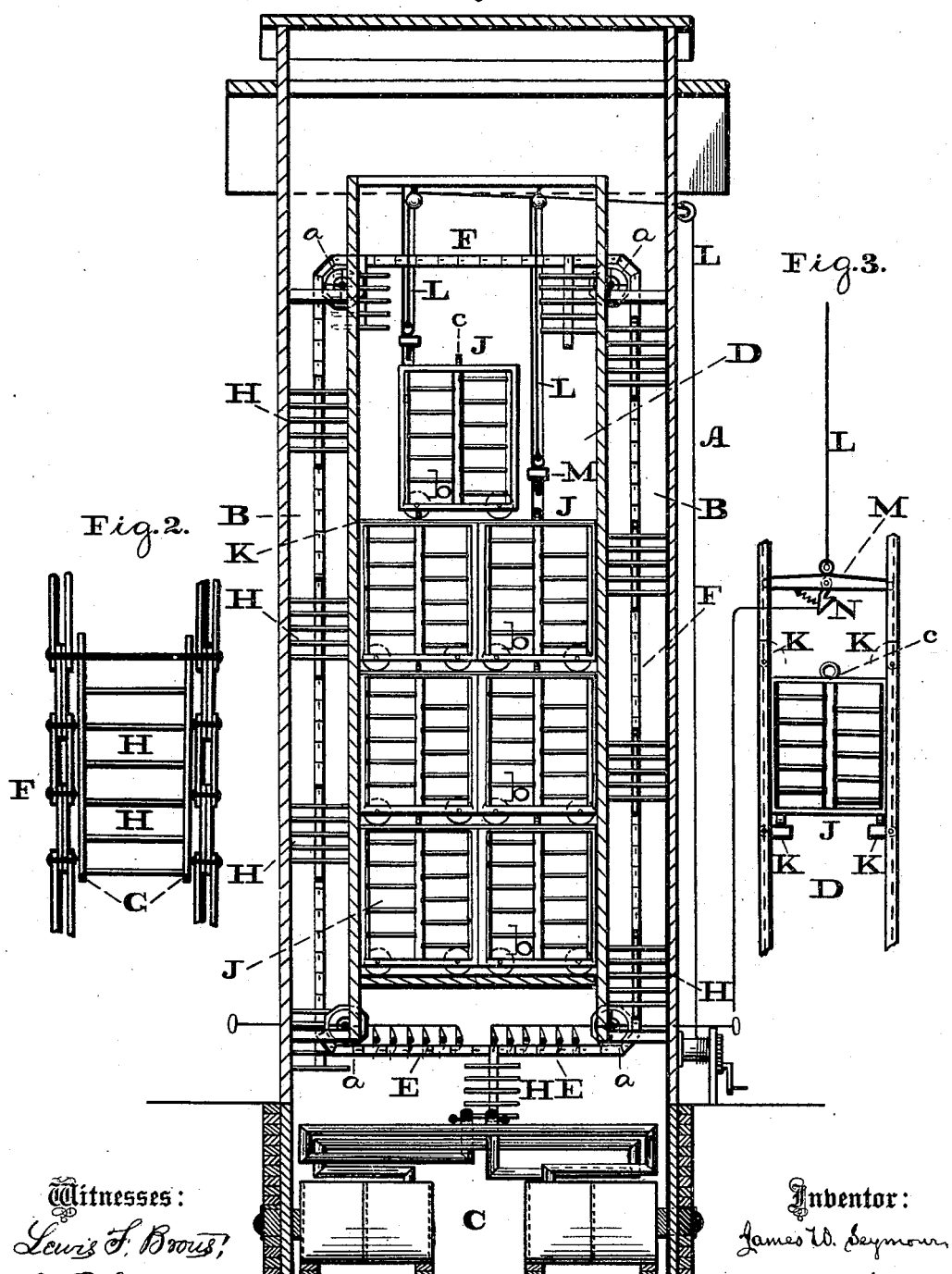

JAMES W. SEYMOUR, OF DOVER, DELAWARE.

IMPROVEMENT IN FRUIT-DRIERS.

Specification forming part of Letters Patent No. 181,987, dated September 5, 1876; application filed March 2, 1876.

*To all whom it may concern:*

Be it known that I, JAMES W. SEYMOUR, of Dover, in the county of Kent and State of Delaware, have invented a new and useful Improvement in Driers for Fruit, &c.; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a longitudinal vertical section of the drier embodying my invention. Fig. 2 it a side view of the suspended tray-carrier and chain therefor. Fig. 3 is a side view of the cars and gravitating supporting-rails therefor, and the self-operating attachment of the hoisting-rope and car.

Similar letters of reference indicate corresponding parts in the several figures.

My invention consists of a drying-building so constructed that the fruit or vegetables shall be exposed first to a high temperature, which prevents decomposition and discoloration, and then passed into a high upright chamber on screens placed on cars, by which the articles are subjected to a gradually and gently declining heat, so that the drying operation is reliably completed, in combination with cars forming fixtures of the chamber, and adapted to be successively lowered, so that the dried articles are accessible.

The invention also consists of gravitating-rails, which fold when the cars reach and pass them, and afterward drop to horizontal position to permit the cars to rest thereupon. It also consists of a self-engaging attachment of the hoisting-rope and car.

Referring to the drawings, A represents a building, at the sides of which there are hot-air flues B, into which heat is directed from the boilers C or other medium at the bottom of the building, or elsewhere. D represents a central chamber, below which are registers E E, which are adjustable independently of each other. The chamber D and flues B are open at top, so as to permit the escape of the vapors from the drying fruit or vegetables. F represents endless chains, which pass around wheels or pulleys a, mounted at the tops and bottoms of the flues, and receiving motion in any well-known manner, and from and between the chains there are suspended at intervals carriers G for trays H, on which the fruit or vegetables will be placed, and, as the carriers are suspended at their upper ends to the chains, they hang freely, and preserve the horizontal position of the trays.

Within the chamber D will be placed cars J, mounted on wheels b; and on the inner sides of the chamber there are jointed rails K, which are adapted to fold upward when struck by an ascending car, and fall when cleared thereby, so that the car may be rested on the rails. The ropes L, for hoisting the cars J, are connected to blocks M, which run in grooves in the chambers, and carry at their lower ends spring-pressed hinged catches N, which are adapted to engage automatically with eyes or hooks c on the upper ends of the cars.

The fruits, vegetables, or other articles to be dried are placed on the trays H of the carriers G, and carried around the flues B, so as to be subjected to the greatest heat, whereby decomposition and discoloration are prevented. After this the articles are placed in the cars J, and subjected to a gradually and gently declining heat, so that the drying will be properly and reliably performed. In some cases it may be necessary to admit more or less heat to one side of the chamber than the other, or cut it off entirely. Hence, the two sets of registers E are independent of each other.

The cars J are fixtures of the chamber, and, in order to remove the fruit or vegetables, they are to be accessible at the bottom. For this purpose there will be an odd number of cars, and the top car—say, on the left side—is run to the right side. Then the elevating rope or chain makes connection with the next car below; and, the cars being self-connecting, the whole number in the left-hand side is elevated, leaving the lower left-hand corner vacant. The right-hand side of the cars is slightly raised by the windlass of the cord or chain, and held by the ratchet and pawl. The under car of the right-hand corner can pass freely to the left-hand corner, and the upper cars are then to be lowered, these movements being continued as long as desired, the dried articles being brought to the bottom, and the gravitating rails not interfering with the passage of the cars.

Having thus described my invention, what I claim as new, and desire to secure by Letters Patent, is—

1. The side flues B, in combination with the carriers H suspended from the endless conveyer F, which passes successively through the said flues, in combination with the inclosed chamber D, and the shifting-cars J, unremovable from said chamber D, substantially as and for the purpose set forth.

2. The drying-chamber D, formed with folding supporting-rails K, and operating with the cars J, substantially as and for the purpose set forth.

3. The combination, with the cars J, of the self-engaging catches N of the hoisting rope or chain, substantially as and for the purpose set forth.

JAMES W. SEYMOUR.

Witnesses:
   THEOPHILUS K. JONES,
   J. L. SMITH.